US011669230B2

(12) United States Patent
Yamamoto et al.

(10) Patent No.: US 11,669,230 B2
(45) Date of Patent: Jun. 6, 2023

(54) DISPLAY CONTROL DEVICE

(71) Applicant: AISIN CORPORATION, Kariya (JP)

(72) Inventors: Kinji Yamamoto, Anjo (JP); Kazuya Watanabe, Anjo (JP)

(73) Assignee: AISIN CORPORATION, Kariya (JP)

( * ) Notice: Subject to any disclaimer, the term of this patent is extended or adjusted under 35 U.S.C. 154(b) by 748 days.

(21) Appl. No.: 16/562,974

(22) Filed: Sep. 6, 2019

(65) Prior Publication Data

US 2020/0081607 A1 Mar. 12, 2020

(30) Foreign Application Priority Data

Sep. 7, 2018 (JP) .............................. JP2018-168213

(51) Int. Cl.
*G06F 3/04842* (2022.01)
*G06T 3/40* (2006.01)
*B60R 1/00* (2022.01)

(52) U.S. Cl.
CPC .......... *G06F 3/04842* (2013.01); *B60R 1/002* (2013.01); *G06T 3/40* (2013.01); *B60R 2300/306* (2013.01); *B60R 2300/307* (2013.01); *B60R 2300/607* (2013.01); *G06F 2203/04806* (2013.01); *G06T 2207/20101* (2013.01); *G06T 2207/30252* (2013.01)

(58) Field of Classification Search
None
See application file for complete search history.

(56) References Cited

U.S. PATENT DOCUMENTS

| 6,580,450 | B1 * | 6/2003 | Kersting | G08B 13/19669 348/E7.086 |
|---|---|---|---|---|
| 9,308,863 | B2 | 4/2016 | Miyoshi et al. | |
| 9,919,650 | B2 | 3/2018 | Miyoshi et al. | |
| 10,402,002 | B2 * | 9/2019 | Yang | G06F 3/04845 |
| 2005/0046615 | A1 * | 3/2005 | Han | G01C 21/36 340/995.13 |
| 2008/0158191 | A1 * | 7/2008 | Yang | G06F 3/04883 345/173 |
| 2013/0010117 | A1 * | 1/2013 | Miyoshi | G06F 3/0412 348/148 |
| 2014/0007021 | A1 * | 1/2014 | Akiyama | G06F 3/0486 715/863 |
| 2015/0116367 | A1 * | 4/2015 | Yada | G06F 3/14 345/661 |

(Continued)

FOREIGN PATENT DOCUMENTS

JP 2013-93048 A 5/2013
JP 2014-33469 A 2/2014

*Primary Examiner* — Delomia L Gilliard
(74) *Attorney, Agent, or Firm* — Sughrue Mion, PLLC

(57) ABSTRACT

A display control device includes: an image acquisition unit configured to acquire captured image data from an imaging unit that captures an image of a peripheral area of a vehicle; a display control unit configured to cause image data based on the captured image data to be displayed on a screen; and an operation receiving unit configured to receive designation of an arbitrary point on the screen, in which the display control unit enlarges display on the screen about the designated point as a center of enlargement in a state where a display position of the designated point does not move on the screen when the operation receiving unit receives the designation of the arbitrary point on the screen.

7 Claims, 12 Drawing Sheets

(56) References Cited

U.S. PATENT DOCUMENTS

| | | | |
|---|---|---|---|
| 2016/0129837 A1* | 5/2016 | Zhu | B60R 1/00 345/173 |
| 2017/0364729 A1* | 12/2017 | Kagaya | G06T 7/174 |
| 2018/0178725 A1 | 6/2018 | Miyoshi et al. | |
| 2019/0193659 A1* | 6/2019 | Miyazawa | G08G 1/00 |
| 2022/0074815 A1* | 3/2022 | Monahan | G01M 15/14 |

* cited by examiner

FIG.5
(a) NORMAL SCREEN
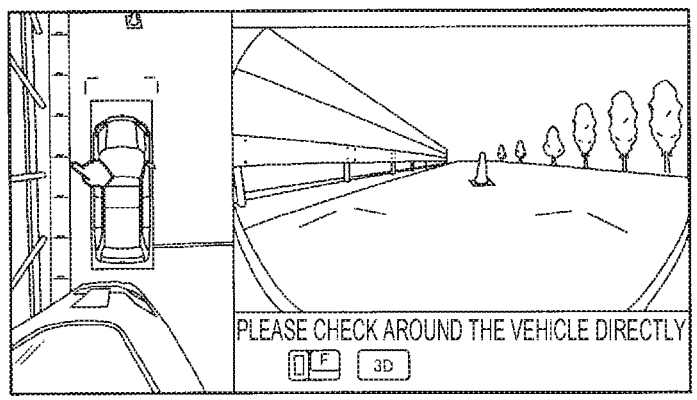
(b) DISPLAY OF ENLARGEMENT ICON
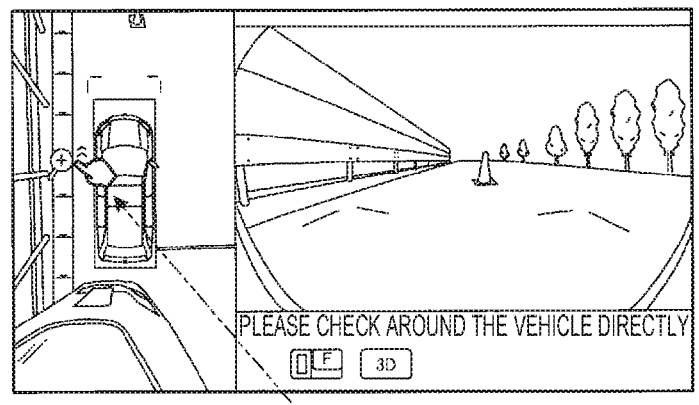
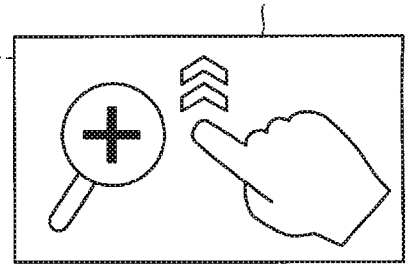
(c) COMPLETION OF ENLARGEMENT
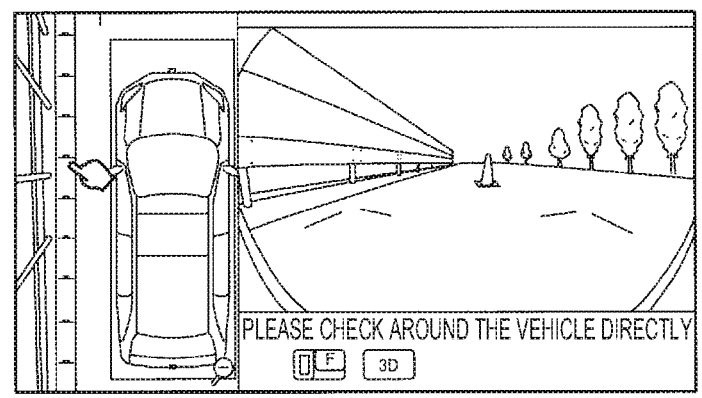

FIG.6
(a) NORMAL SCREEN
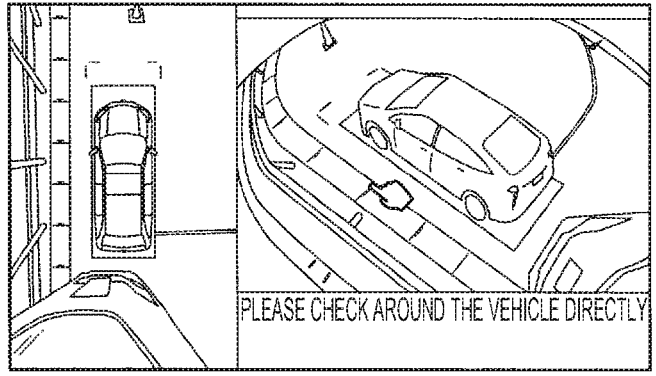
(b) DISPLAY OF ENLARGEMENT ICON
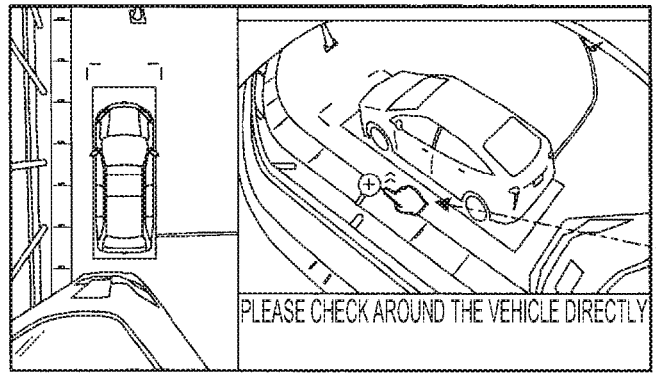
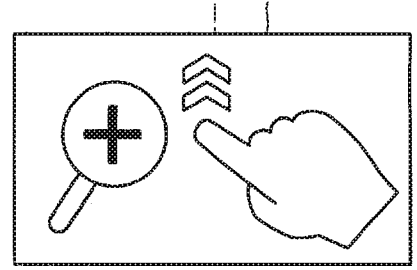
51
(c) COMPLETION OF ENLARGEMENT
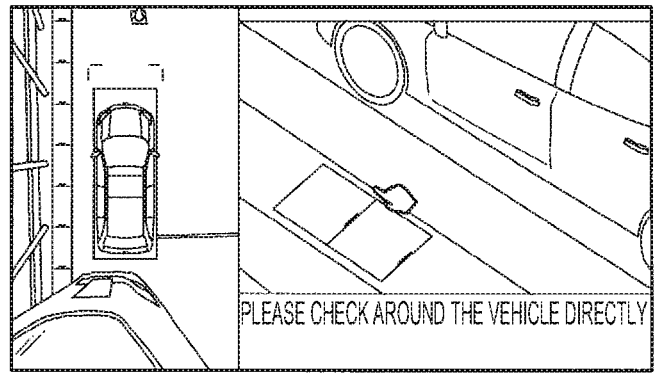

FIG.7
(a) NORMAL SCREEN
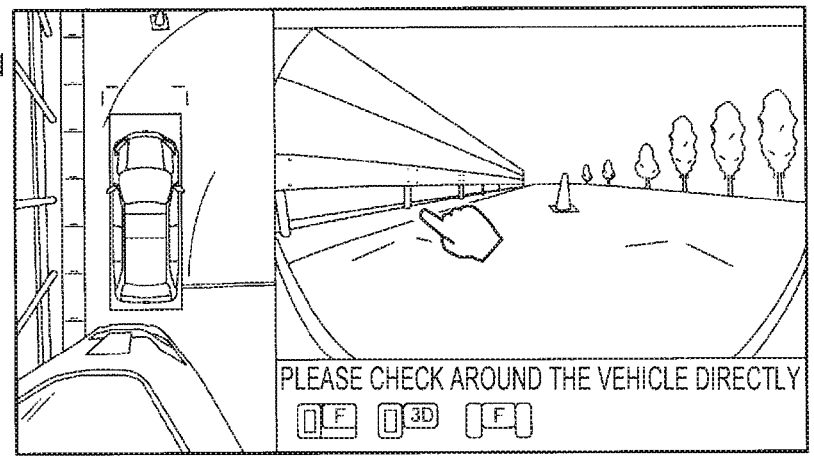
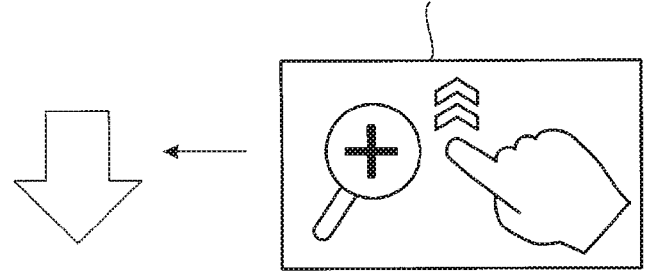
(b) COMPLETION OF ENLARGEMENT
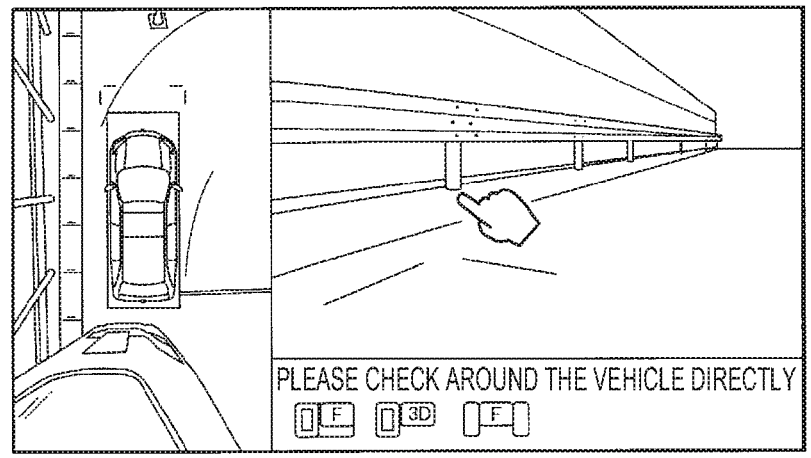

FIG.8
(a) ENLARGEMENT SCREEN
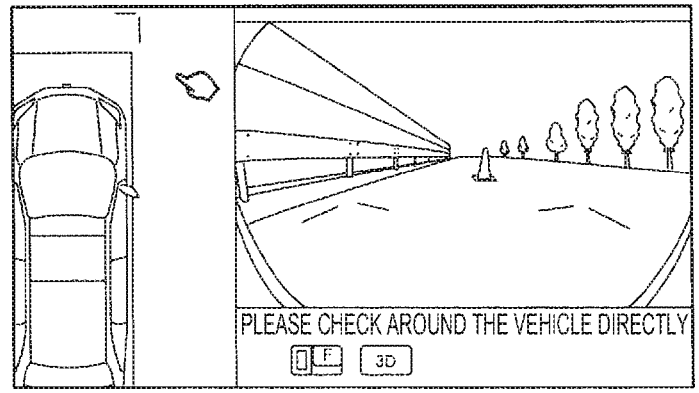
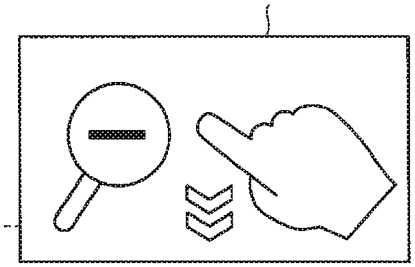
(b) DISPLAY OF REDUCTION ICON (CANCELLATION OF ENLARGEMENT)
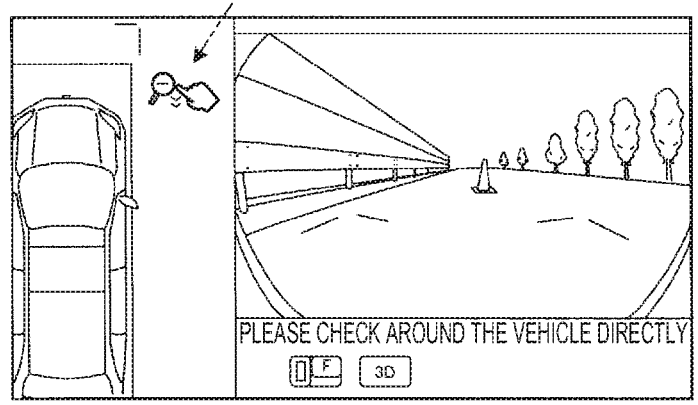
(c) COMPLETION OF REDUCTION (NORMAL SCREEN)
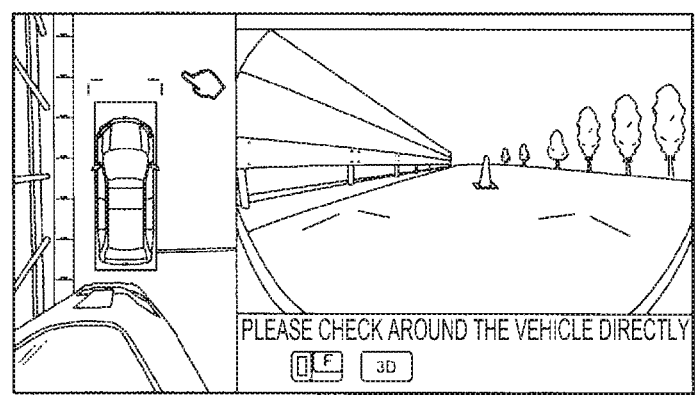

FIG.9
(a) NORMAL SCREEN
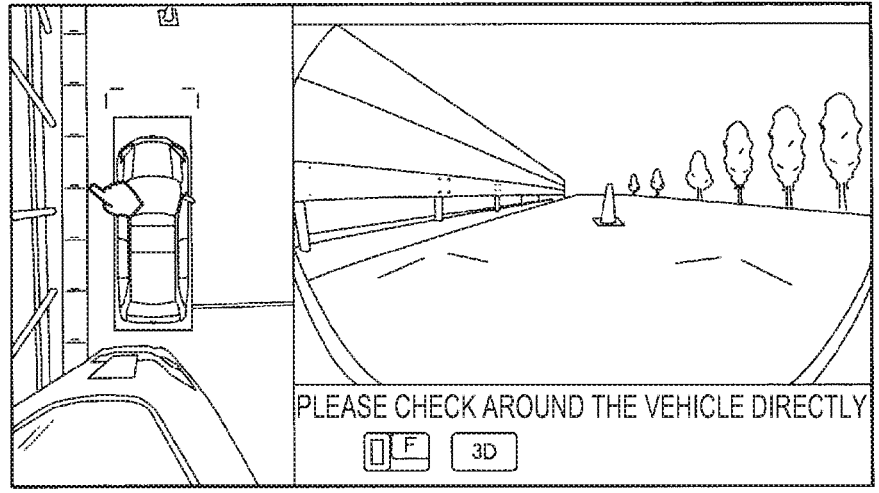
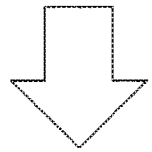
(b) COMPLETION OF ENLARGEMENT
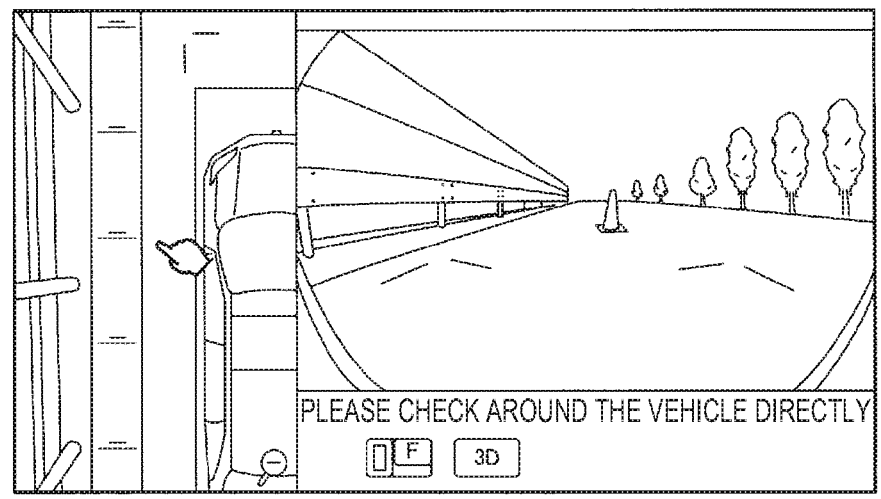

FIG.11
(a) NORMAL SCREEN
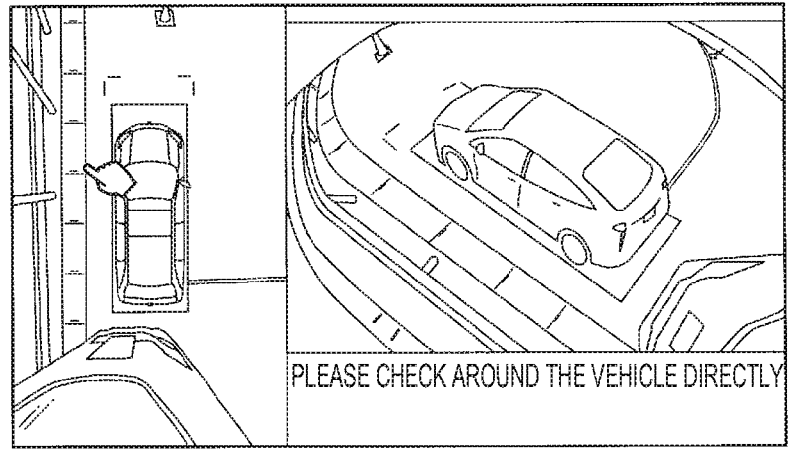
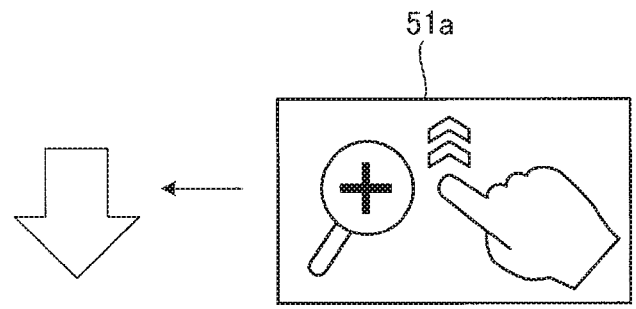
(b) COMPLETION OF ENLARGEMENT
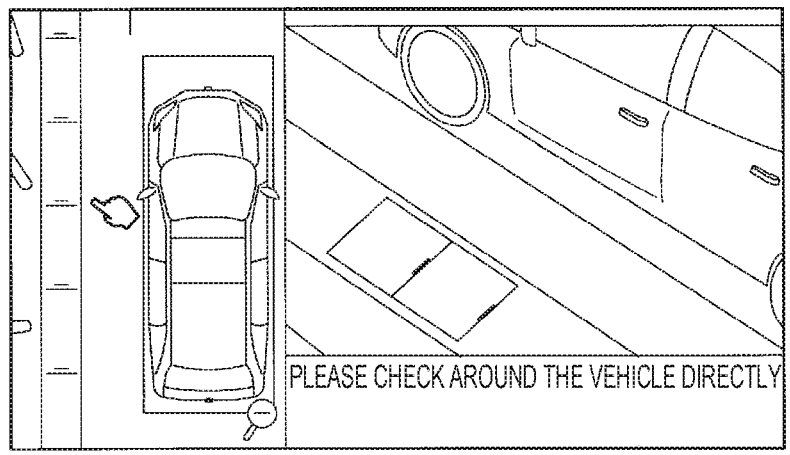

FIG.12
(a) NORMAL SCREEN
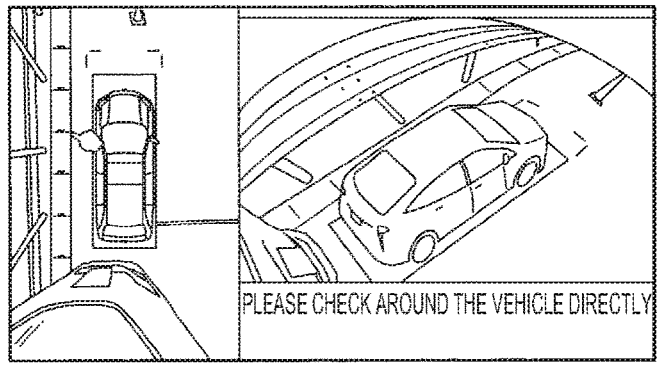
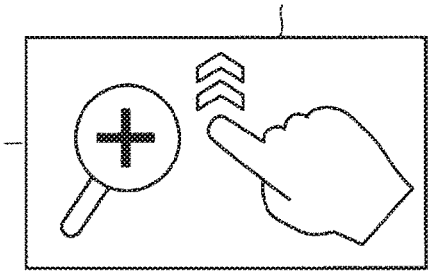
(b) VIEWPOINT POSITION MOVEMENT
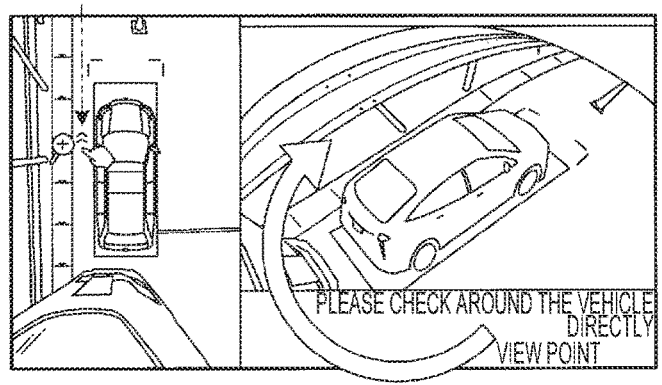
(c) COMPLETION OF ENLARGEMENT
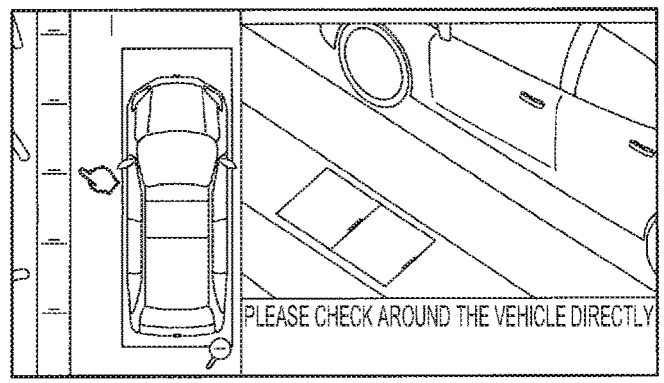

DISPLAY CONTROL DEVICE

CROSS REFERENCE TO RELATED APPLICATIONS

This application is based on and claims priority under 35 U.S.C. § 119 to Japanese Patent Application 2018-168213, filed on Sep. 7, 2018, the entire contents of which are incorporated herein by reference.

TECHNICAL FIELD

This disclosure relates to a display control device.

BACKGROUND DISCUSSION

In the related art, there has been proposed a vehicle periphery monitoring device which causes a driver to recognize the situation around a vehicle by capturing an image of the periphery of the vehicle using a plurality of imaging units provided around the vehicle and displaying a plurality of captured image data and the like on an in-vehicle display device (see, e.g., JP 2014-033469A (Reference 1)).

In the related art described above, after displaying composite image data based on the plurality of captured image data on the display device, when enlarging the composite data according to an operation received from a user, a partial area which is determined in advance is enlarged. Therefore, there is room for further improvement in terms of improving the controllability of display.

SUMMARY

A display control device according to an aspect of this disclosure includes, for example, an image acquisition unit configured to acquire captured image data from an imaging unit that captures an image of a peripheral area of a vehicle, a display control unit configured to cause image data based on the captured image data to be displayed on a screen, and an operation receiving unit configured to receive designation of an arbitrary point on the screen, wherein the display control unit enlarges display on the screen about the designated point as a center of enlargement in a state where a display position of the designated point does not move on the screen when the operation receiving unit receives the designation of the arbitrary point on the screen.

BRIEF DESCRIPTION OF THE DRAWINGS

The foregoing and additional features and characteristics of this disclosure will become more apparent from the following detailed description considered with the reference to the accompanying drawings, wherein:

FIG. 5 is a flow diagram illustrating an example of a procedure of enlargement control by a display control unit according to the first embodiment;

FIG. 6 is a flow diagram illustrating another example of a procedure of enlargement control by the display control unit according to the first embodiment;

FIG. 7 is a flow diagram illustrating still another example of a procedure of enlargement control by the display control unit according to the first embodiment;

FIG. 8 is a flow diagram illustrating an example of a procedure of cancellation of enlargement control by the display control unit according to the first embodiment;

FIG. 9 is a flow diagram illustrating an example of a procedure of enlargement control by the display control unit according to a comparative example;

FIG. 11 is a flow diagram illustrating an example of a procedure of enlargement control by the display control unit according to a second embodiment; and FIG. 12 is a flow diagram illustrating another example of a procedure of enlargement control by the display control unit according to the second embodiment.

DETAILED DESCRIPTION

Hereinafter, exemplary embodiments disclosed here will be disclosed. A configuration of the embodiments described below and actions, results, and effects caused by the configuration are given by way of example. The disclosure may be realized by a configuration other than the configuration disclosed in the following embodiments, and at least one of various effects based on a basic configuration and derivative effects may be obtained.

First Embodiment

A first embodiment will be described with reference to FIGS. 1 to 10.

(Configuration of Vehicle)

Figure 1:
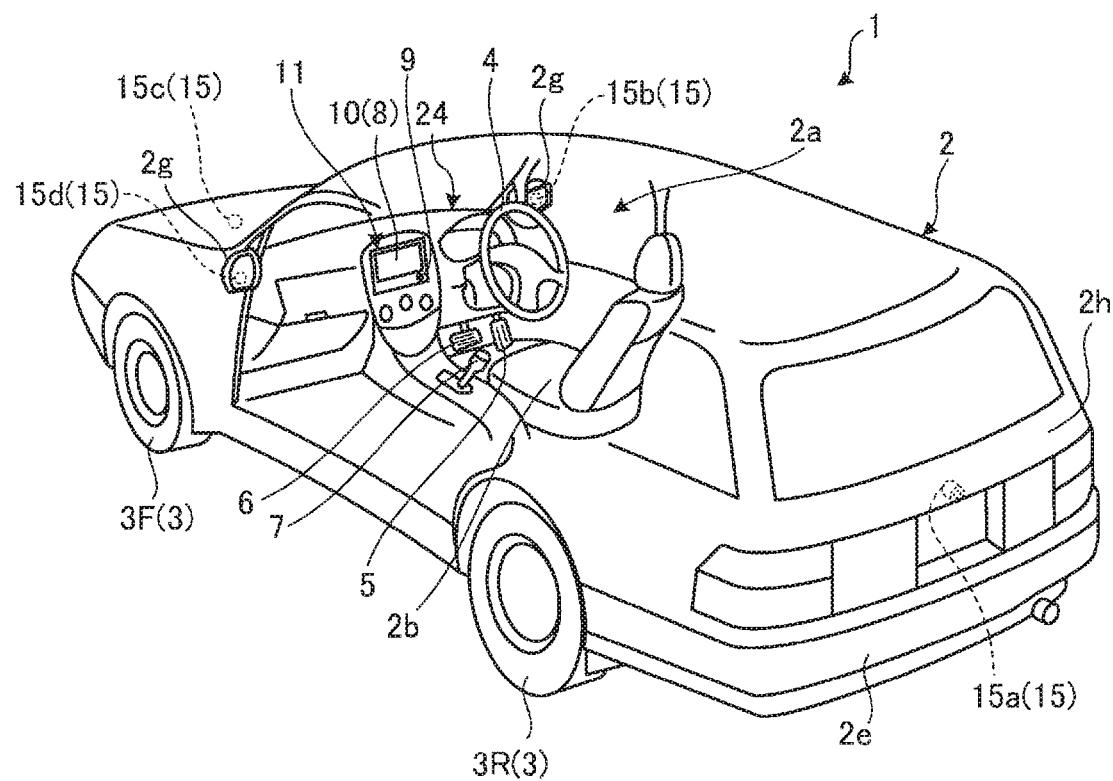
FIG. 1 is a perspective view illustrating an example of a state where a portion of a vehicle cabin of a vehicle equipped with a display control device according to a first embodiment is seen through the vehicle.
Figure 2:
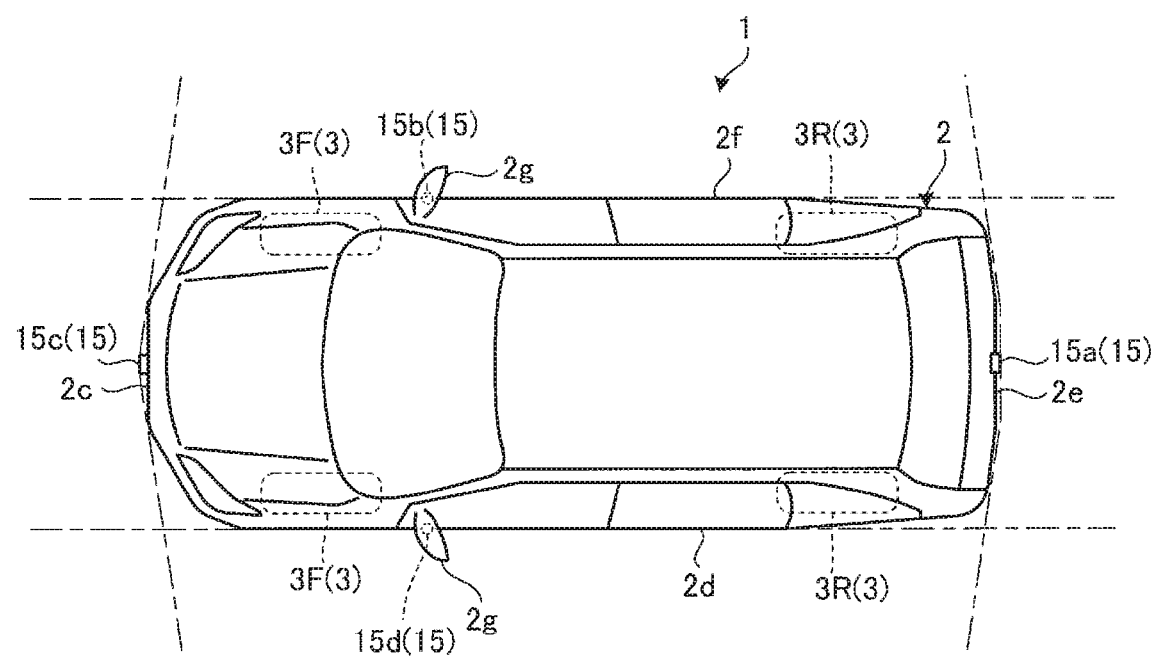
FIG. 2 is a plan view illustrating an example of the vehicle equipped with the display control device according to the first embodiment.

FIG. 1 is a perspective view illustrating an example of a state where a portion of a vehicle cabin 2a of a vehicle 1 equipped with a display control device according to a first embodiment is seen through the vehicle. FIG. 2 is a plan view illustrating an example of the vehicle 1 equipped with the display control device according to the first embodiment.

The vehicle 1 according to the first embodiment may be, for example, an automobile having an internal combustion engine as a drive source, i.e., internal combustion engine automobile, an automobile having an electric motor (not illustrated) as a drive source, i.e., an electric automobile or a fuel cell automobile, or a hybrid automobile having both the internal combustion engine and the electric motor as a drive source, or may be an automobile having any other drive source. Further, the vehicle 1 may be equipped with any of various speed-change devices, and may be equipped with various devices, for example, systems or components which are required for driving the internal combustion engine or the electric motor. Further, the type, the number, and the layout of devices related to the driving of wheels 3 in the vehicle 1 may be set in various ways.

As illustrated in FIG. 1, a vehicle body 2 configures the vehicle cabin 2a in which a passenger (not illustrated) gets. In the vehicle cabin 2a, a steering unit 4, an acceleration operation unit 5, a braking operation unit 6, a speed-change operation unit 7, and the like are provided in a state of facing a seat 2b of a driver as a passenger. The steering unit 4 is, for example, a steering wheel that protrudes from a dashboard 24. The acceleration operation unit 5 is, for example, an accelerator pedal that is located under the driver's feet. The braking operation unit 6 is, for example, a brake pedal that is located under the driver's feet. The speed-change operation unit 7 is, for example, a shift lever that protrudes from a center console. In addition, the steering unit 4, the acceleration operation unit 5, the braking operation unit 6, the speed-change operation unit 7, and the like are not limited thereto.

Further, in the vehicle cabin 2a, a display device 8 and a voice output device 9 are provided. The voice output device 9 is, for example, a speaker. The display device 8 is, for example, a liquid crystal display (LCD) or an organic electroluminescent display (OELD). The display device 8 is covered with a transparent operation input unit 10 such as a touch panel and the like. A passenger may visually recognize an image displayed on a display screen of the display device 8 through the operation input unit 10. Further, the passenger may execute an operation input by touching, pushing, or moving a position of the operation input unit 10 corresponding to the image displayed on the display screen of the display device 8 with the finger. For example, the display device 8, the voice output device 9, and the operation input unit 10 are provided, for example, in a monitor device 11 located at the center of the dashboard 24 in the vehicle width direction, i.e., in the transverse direction. The monitor device 11 may have an operation input unit (not illustrated) such as a switch, a dial, a joystick, or a push button. Further, a voice output device (not illustrated) may be provided at another position in the vehicle cabin 2a other than the monitor device 11. Furthermore, voice may be output from both the voice output device 9 of the monitor device 11 and the other voice output device. In addition, the monitor device 11 may also be used as, for example, a navigation system or an audio system.

As illustrated in FIGS. 1 and 2, the vehicle 1 is, for example, a four-wheel vehicle, and includes two left and right front wheels 3F and two left and right rear wheels 3R. All of these four wheels 3 may be configured to be steerable.

Further, the vehicle body 2 is, for example, provided with four imaging units 15a to 15d as a plurality of imaging units 15. The imaging unit 15 is, for example, a digital camera having an imaging element such as a charge coupled device (CCD) or a CMOS image sensor (CIS) incorporated therein. The imaging unit 15 may output captured image data at a predetermined frame rate. The captured image data may be moving image data. Each imaging unit 15 has a wide-angle lens or a fish-eye lens, and may capture an image within a range, for example, from 140° to 220° in the horizontal direction. Further, the optical axis of the imaging unit 15 may be set obliquely downward. Thus, the imaging unit 15 sequentially captures an image of the peripheral environment outside the vehicle 1 including the road surface on which the vehicle 1 is movable or an object, and outputs the captured image as captured image data. Here, the object is a rock, a tree, a person, a bicycle, or another vehicle, for example, which may become an obstacle, for example, at the time of driving of the vehicle 1.

The imaging unit 15a is located, for example, on a right end 2e of the vehicle body 2 and is provided on a wall portion below a rear window of a rear hatch door 2h. The imaging unit 15b is located, for example, on a right end 2f of the vehicle body 2 and is provided on a right door mirror 2g. The imaging unit 15c is located, for example, on a front side of the vehicle body 2, i.e., on a front end 2c in the longitudinal direction of the vehicle and is provided on a front bumper or a front grill. The imaging unit 15d is located, for example, on a left end 2d of the vehicle body 2 and is provided on a left door mirror 2g.

(Hardware Configuration of ECU)

Figure 3:
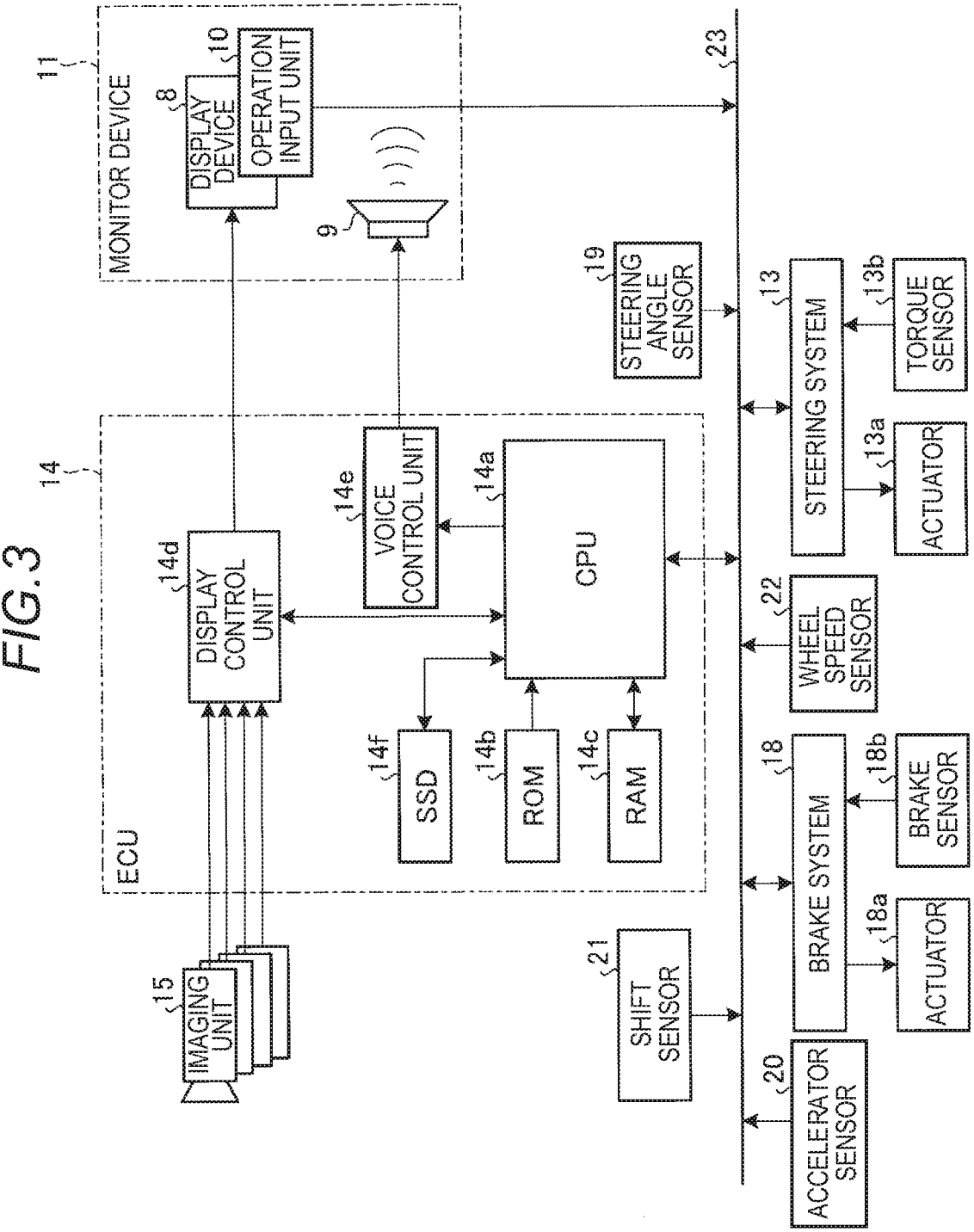
FIG. 3 is a block diagram illustrating an example of a configuration of an ECU and a peripheral configuration thereof according to the first embodiment.

Next, an electronic control unit (ECU) 14 of the first embodiment and a peripheral configuration of the ECU 14 will be described with reference to FIG. 3. FIG. 3 is a block diagram illustrating a configuration of the ECU 14 and a peripheral configuration thereof according to the first embodiment.

As illustrated in FIG. 3, in addition to the ECU 14 as a display control device, the monitor device 11, a steering system 13, a brake system 18, a steering angle sensor 19, an accelerator sensor 20, a shift sensor 21, a wheel speed sensor 22, and the like are electrically connected via an in-vehicle network 23 as an electric communication line. The in-vehicle network 23 is configured with, for example, a controller area network (CAN).

The ECU 14 may control the steering system 13, the brake system 18, and the like by transmitting a control signal through the in-vehicle network 23. Further, the ECU 14 may receive, for example, detection results of a torque sensor 13b, a brake sensor 18b, the steering angle sensor 19, the accelerator sensor 20, the shift sensor 21, and the wheel speed sensor 22 or an operation signal of the operation input unit 10 through the in-vehicle network 23.

Further, the ECU 14 may execute an arithmetic processing or an image processing based on image data obtained by the plurality of imaging units 15 to generate an image with a wider viewing angle or to generate a virtual bird's-eye view image of the vehicle 1 as viewed from above. In addition, the bird's-eye view image may also be referred to as a planar image.

The ECU 14 includes, for example, a central processing unit (CPU) 14a, a read only memory (ROM) 14b, a random access memory (RAM) 14c, a display control unit 14d, a voice control unit 14e, and a solid state drive (SSD) 14f.

The CPU 14a may execute, for example, various arithmetic processings and various controls such as an image processing related to an image displayed on the display device 8, determination of a target position of the vehicle 1, calculation of a movement route of the vehicle 1, determination of the presence or absence of interference with an object, automatic control of the vehicle 1, and cancellation of automatic control. The CPU 14a may read a program which is installed and stored in a non-volatile storage device such as the ROM 14b, and may execute an arithmetic processing according to the program.

The RAM 14c temporarily stores various data used in calculation in the CPU 14a.

The display control unit 14d mainly executes an image processing using image data obtained by the imaging unit 15 or combination of image data displayed by the display device 8 among the arithmetic processings in the ECU 14.

The voice control unit 14e mainly executes a processing of voice data output from the voice output device 9 among the arithmetic processings in the ECU 14.

The SSD 14f is a rewritable non-volatile storage unit and may store data even when a power supply of the ECU 14 is turned off.

In addition, the CPU 14a, the ROM 14b, and the RAM 14c may be integrated in the same package. Further, the ECU 14 may be configured to use another logical operation processor such as a digital signal processor (DSP) or a logic circuit instead of the CPU 14a. Further, a hard disk drive (HDD) may be provided instead of the SSD 14f, and the SSD 14f or the HDD may be provided separately from the ECU 14.

The steering system 13 includes an actuator 13a and a torque sensor 13b and steers at least two wheels 3. That is, the steering system 13 is electrically controlled by the ECU 14 and the like to operate the actuator 13a. The steering system 13 is, for example, an electric power steering system or a steer-by-wire (SBW) system. The steering system 13 adds a torque, i.e., assistance torque to the steering unit 4 by the actuator 13a to supplement a steering force, or steers the wheel 3 by the actuator 13a. In this case, the actuator 13a may steer one wheel 3, or may steer a plurality of wheels 3. Further, the torque sensor 13b detects, for example, a torque that the driver gives to the steering unit 4.

The brake system 18 is, for example, an anti-lock brake system (ABS) that prevents locking of a brake, an electronic stability control (ESC) that prevents side slipping of the vehicle 1 during cornering, an electric brake system that increase a brake force to execute brake assistance, or a brake-by-wire (BBW). The brake system 18 applies a braking force to the wheel 3 and thus to the vehicle 1 via an actuator 18a. Further, the brake system 18 may execute various controls by detecting the locking of the brake, the idle rotation of the wheel 3, and the sign of side slipping from a difference in the rotation of the left and right wheels 3. The brake sensor 18b is, for example, a sensor that detects the position of a movable element of the braking operation unit 6. The brake sensor 18b may detect the position of a brake pedal as the movable element. The brake sensor 18b includes a displacement sensor.

The steering angle sensor 19 is, for example, a sensor that detects the steering amount of the steering unit 4 such as a steering wheel and the like. The steering angle sensor 19 is configured using a Hall element and the like. The ECU 14 acquires the steering amount of the steering unit 4 by the driver or the steering amount of each wheel 3 at the time of automatic steering from the steering angle sensor 19 to execute various controls. In addition, the steering angle sensor 19 detects the rotation angle of a rotating element included in the steering unit 4. The steering angle sensor 19 is an example of an angle sensor.

The accelerator sensor 20 is, for example, a sensor that detects the position of a movable element of the acceleration operation unit 5. The accelerator sensor 20 may detect the position of an accelerator pedal as the movable element. The accelerator sensor 20 includes a displacement sensor.

The shift sensor 21 is, for example, a sensor that detects the position of a movable element of the speed-change operation unit 7. The shift sensor 21 may detect the position of a lever, an arm, or a button as the movable element. The shift sensor 21 may include a displacement sensor, or may be configured as a switch.

The wheel speed sensor 22 is a sensor that detects the amount of rotation or the number of revolutions per unit time of the wheel 3. The wheel speed sensor 22 outputs a wheel speed pulse number indicating the detected number of revolutions as a sensor value. The wheel speed sensor 22 may be configured using, for example, a Hall element. The ECU 14 calculates the amount of movement of the vehicle 1 based on the sensor value acquired from the wheel speed sensor 22 to execute various controls. In addition, the wheel speed sensor 22 may be provided in the brake system 18 in some cases. In that case, the ECU 14 acquires the detection result of the wheel speed sensor 22 via the brake system 18.

In addition, the configuration, arrangement, and electrical connection form of various sensors or actuators described above are merely illustrative, and may be set and changed in various ways.

(Software Configuration of ECU)

Figure 4:
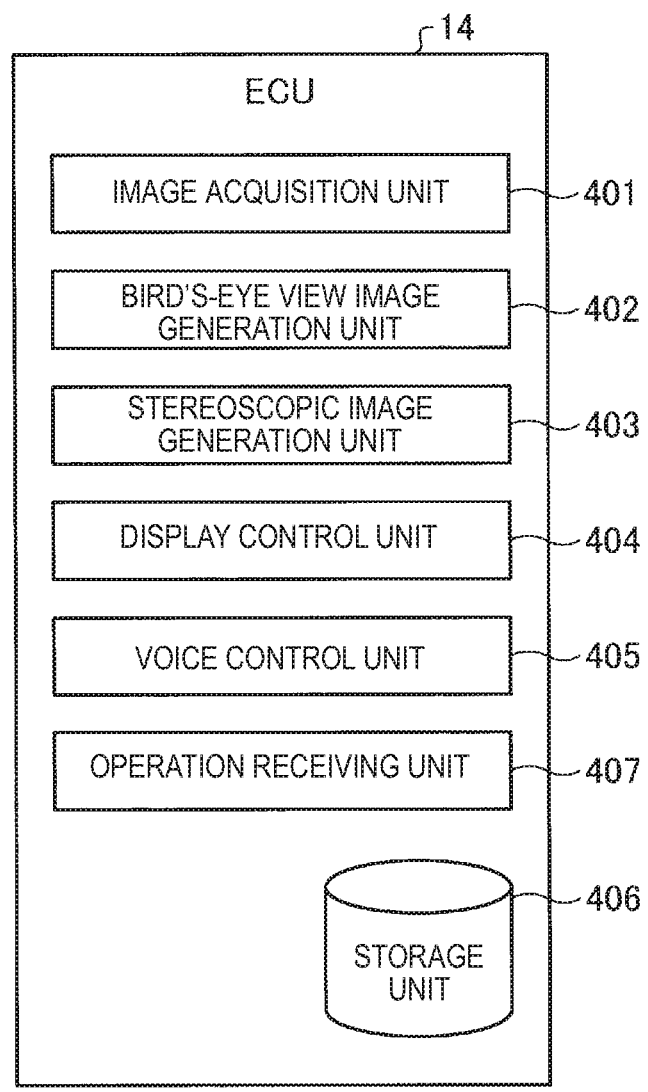
FIG. 4 is a diagram exemplifying a software configuration realized by the ECU according to the first embodiment.

Next, a software configuration of the ECU 14 of the first embodiment will be described with reference to FIG. 4. FIG. 4 is a diagram exemplifying a software configuration realized by the ECU 14 according to the first embodiment.

As illustrated in FIG. 4, the ECU 14 includes an image acquisition unit 401, a bird's-eye view image generation unit 402, a stereoscopic image generation unit 403, a display control unit 404, a voice control unit 405, an operation receiving unit 407, and a storage unit 406. The CPU 14a functions as the image acquisition unit 401, the bird's-eye view image generation unit 402, the stereoscopic image generation unit 403, the display control unit 404, the voice control unit 405, or the operation receiving unit 407 by executing a processing according to a program. Further, the RAM 14c or the ROM 14b functions as the storage unit 406. In addition, at least some of the functions of the respective units may be realized by hardware. For example, the display control unit 404 may be realized by the display control unit 14d described above. Further, the voice control unit 405 may be realized by the voice control unit 14e described above. Further, the operation receiving unit 407 may be realized by the above-described operation input unit 10.

The image acquisition unit 401 acquires a plurality of captured image data from the plurality of imaging units 15 which capture an image of a peripheral area of the vehicle 1.

The bird's-eye view image generation unit 402 converts the captured image data acquired by the image acquisition unit 401 to generate bird's-eye view image data as composite image data based on a virtual viewpoint. As the virtual viewpoint, for example, it is conceivable to set a position that is upwardly spaced apart from the vehicle 1 by a predetermined distance. The bird's-eye view image data is image data generated by combining the captured image data acquired by the image acquisition unit 401, and is image data on which an image processing has been performed by the bird's-eye view image generation unit 402 so as to become display image data based on the virtual viewpoint. The bird's-eye view image data is image data indicating the periphery of the vehicle 1 from the bird's-eye viewpoint on the basis of a centrally disposed vehicle icon indicating the vehicle 1.

The stereoscopic image generation unit 403 generates virtual projection image data by projecting the captured image data acquired by the image acquisition unit 401 onto a virtual projection plane (three-dimensional shape model) surrounding the periphery of the vehicle 1 which is determined on the basis of the position where the vehicle 1 exists. Further, the stereoscopic image generation unit 403 disposes a vehicle shape model corresponding to the vehicle 1 stored in the storage unit 406 in a three-dimensional virtual space including the virtual projection plane. Thus, the stereoscopic image generation unit 403 generates stereoscopic image data as composite image data.

The display control unit 404 causes the captured image data acquired by the imaging unit 15 to be displayed on the display device 8. Further, the display control unit 404 causes the bird's-eye view image data generated by the bird's-eye view image generation unit 402 to be displayed on the display device 8. Further, the display control unit 404 causes the stereoscopic image data generated by the stereoscopic image generation unit 403 to be displayed on the display device 8. Further, the display control unit 404 controls display content according to various user operations on the screen on which the captured image data, the bird's-eye view image data, the stereoscopic image data, and the like are displayed. Various controls by the display control unit 404 will be described later.

The voice control unit 405 combines an operation voice, various notification voices, and the like in the display device 8 and outputs the result to the voice output device 9.

The operation receiving unit 407 receives an operation by a user. For example, the operation receiving unit 407 may receive an operation input from the transparent operation input unit 10 provided on the display device 8, or may receive an operation from a switch or a dial. Furthermore, the operation receiving unit 407 may receive an operation from a touch pad provided as one corresponding to the display device 8.

The storage unit 406 stores data used in an arithmetic processing of each unit or data regarding the result of the arithmetic processing. Further, the storage unit 406 also stores various icons displayed by the display control unit 404, a vehicle shape model, voice data, and the like.

(Enlargement by Display Control Unit)

Next, enlargement control in the display of bird's-eye view image data by the display control unit 404 will be described with reference to FIG. 5. FIG. 5 is a flow diagram illustrating an example of a procedure of enlargement control by the display control unit 404 according to the first embodiment. In FIG. 5, it is assumed that the screen as an initial screen (normal screen) of the display device 8 is divided into two left and right sides. Bird's-eye view image data generated by the bird's-eye view image generation unit 402 is displayed on the left side. On the right side, for example, captured image data indicating the front of the vehicle 1 acquired by the imaging unit 15c on the front side of the vehicle 1 is displayed.

As illustrated in FIG. 5, the display control unit 404 may enlarge and display the bird's-eye view image data on the display device 8 by a predetermined user operation.

Specifically, as illustrated in (a) of FIG. 5, an arbitrary position in the area of the display device 8 where bird's-eye view image data is displayed is designated by the user. The user may designate the arbitrary position on the screen as a designated point by touching that position. The operation receiving unit 407 receives such user designation. Then, the display control unit 404 causes an enlargement icon 51 to be displayed at the designated point which is a touch position on the display device 8 as illustrated in (b) of FIG. 5.

The enlargement icon 51 includes, for example, a magnifying glass mark with "plus." The enlargement icon 51 also includes a mark in which two inverted "V" letters are superimposed, and a finger mark attached thereto. The mark in which two inverted "V" letters are superimposed means an arrow pointing upward. In other words, the mark reminds an upward sliding operation as an operation that the user may perform next. That is, the enlargement icon 51 includes a mark that reminds an upward sliding operation that the user may perform next and a magnifying glass mark indicating enlargement control (an example of control) performed when the sliding operation is received. By moving the finger upward on the enlargement icon 51 while keeping the designation of the arbitrary point, the operation receiving unit 407 may receive the designation by the user operation, and the user may cause the display control unit 404 to execute enlargement control of the display of the bird's eye view image data. The above-described operation by the user received by the operation receiving unit 407 may be sliding or dragging.

The user performs upward sliding or dragging on the enlargement icon 51 according to the enlargement icon 51. The operation receiving unit 407 receives designation by such user operation, and as illustrated in (c) of FIG. 5, the display control unit 404 enlarges the display of the bird's-eye view image data to a predetermined magnification. The predetermined magnification may be a magnification that is determined in advance. Alternatively, the predetermined magnification may be changed according to the amount by which the user moves the finger, i.e., the amount of sliding or the amount of dragging received by the operation receiving unit 407.

When enlarging the display, the display control unit 404 gradually changes the display of the bird's-eye view image data. Further, the display control unit 404 enlarges the display about the designated point which is designated by the user and is received by the operation receiving unit 407, i.e., the display position of the enlargement icon 51. At this time, the received designated point remains at a fixed display position on the screen. That is, the display is enlarged without moving the display position of the received designated point.

As described above, the display control unit 404 enlarges the display of the bird's-eye view image data to a predetermined magnification and completes the enlargement control. When the enlargement control is completed, the enlargement icon 51 is hidden. However, the enlargement icon 51 may be hidden simultaneously with the start of the enlargement control.

Such enlargement control may also be performed on display of stereoscopic image data.

FIG. 6 is a flow diagram illustrating another example of a procedure of enlargement control by the display control unit 404 according to the first embodiment. In FIG. 6, the bird's-eye view image data generated by the bird's-eye view image generation unit 402 is displayed on the left side of the screen of the display device 8 which is divided into two left and right sides as an initial screen (normal screen). The stereoscopic image data generated by the stereoscopic image generation unit 403 is displayed on the right side.

As illustrated in (a) of FIG. 6, when the user touches an arbitrary position in the area of the display device 8 where stereoscopic image data is displayed, the arbitrary position is designated as a designated point. The operation receiving unit 407 receives such user designation. Then, the display control unit 404 causes the enlargement icon 51 to be displayed at the designated point on the display device 8 as illustrated in (b) of FIG. 6. When the user performs upward sliding or dragging according to the enlargement icon 51, the operation receiving unit 407 receives designation by such user operation, and as illustrated in (c) of FIG. 6, the display control unit 404 gradually enlarges the display of the stereoscopic image data to a predetermined magnification.

Such enlargement control may also be performed on the display of captured image data.

FIG. 7 is a flow diagram illustrating still another example of a procedure of enlargement control by the display control unit 404 according to the first embodiment. In FIG. 7, similar to FIG. 5, bird's-eye view image data is displayed on the left side of the screen and captured image data is displayed on the right side of the screen.

As illustrated in (a) of FIG. 7, when the user touches an arbitrary position in the area of the display device 8 where the captured image data is displayed, the operation receiving unit 407 receives designation by such user operation and the display control unit 404 causes the enlargement icon 51 to be displayed at a designated point which is a touch position on the display device 8. When the user performs upward sliding or dragging according to the enlargement icon 51, the operation receiving unit 407 receives designation by such user operation, and as illustrated in (b) of FIG. 7, the display control unit 404 gradually enlarges the display of the captured image data to a predetermined magnification.

(Enlargement Cancellation by Display Control Unit)

An example of performing enlargement cancellation (reduction) on the display enlarged as described above will be described with reference to FIG. 8. FIG. 8 is a flow diagram illustrating an example of a procedure of cancellation of enlargement control by the display control unit 404 according to the first embodiment.

As illustrated to (a) of FIG. 8, the display of bird's-eye view image data on the left side is enlarged to a predetermined magnification. When the user touches an arbitrary position in the area of the display device 8 where the bird's-eye view image data is displayed, the operation receiving unit 407 receives designation by such user operation, and as illustrated in (b) of FIG. 8, the display control unit 404 causes a reduction icon (enlargement cancellation icon) 52 to be displayed at a designated point which is a touch position on the display device 8.

The reduction icon 52 includes a magnifying glass mark with "minus," a mark in which two "V" letters are superimposed, and a finger mark attached thereto. The mark in which two "V" letters are superimposed means an arrow pointing downward. In other words, the mark reminds a downward sliding operation as an operation that the user may perform next. That is, the reduction icon 52 includes a mark that remains a downward sliding operation that the user may perform next and a magnifying glass mark indicating reduction control (control of enlargement cancellation) performed when the sliding operation is received. By performing sliding or dragging on the reduction icon 52 while keeping designation of an arbitrary point, the operation receiving unit 407 may receive designation by such user operation and the user may cause the display control unit 404 to execute cancellation of the enlargement control of the display of the bird's eye view image data.

When the user performs downward sliding or dragging on the reduction icon 52 according to the reduction icon 52, the operation receiving unit 407 receives designation by such user operation, and as illustrated in (c) of FIG. 8, the display control unit 404 reduces the display of the bird's-eye view image data to a predetermined magnification. The predetermined magnification may be a magnification that is determined in advance such as an initial value on an initial screen. Alternatively, the predetermined magnification may be changed according to the amount of sliding or the amount of dragging by the user which is received by the operation receiving unit 407.

When reducing the display, the display control unit 404 gradually changes the display of the bird's-eye view image data. Further, the display control unit 404 reduces the display about the designated point which is designated by the user and is received by the operation receiving unit 407, i.e., the display position of the reduction icon 52. At this time, the received designated point remains at a fixed display position on the screen. That is, the display is reduced without moving the display position of the received designated point.

As described above, the display control unit 404 reduces the display of the bird's-eye view image data to a predetermined magnification and completes the cancellation of the enlargement control. When the cancellation of the enlargement control is completed, the reduction icon 52 is hidden. However, the reduction icon 52 may be hidden simultaneously with the start of the cancellation of the enlargement control.

Comparative Example

For example, in the configuration of Reference 1 described above, an image in the area designated by an operation of touching any one area of a bird's-eye view image display area is enlarged and displayed as an enlargement target image in the bird's-eye view image display area. However, in the configuration of Reference 1, it is not possible to enlarge an arbitrary position since a predetermined divided area is enlarged. Further, since the positions of a display object before and after enlargement may be different, the user may miss the display object after enlargement, and it may take time to grasp the screen after enlargement.

Figure 10:
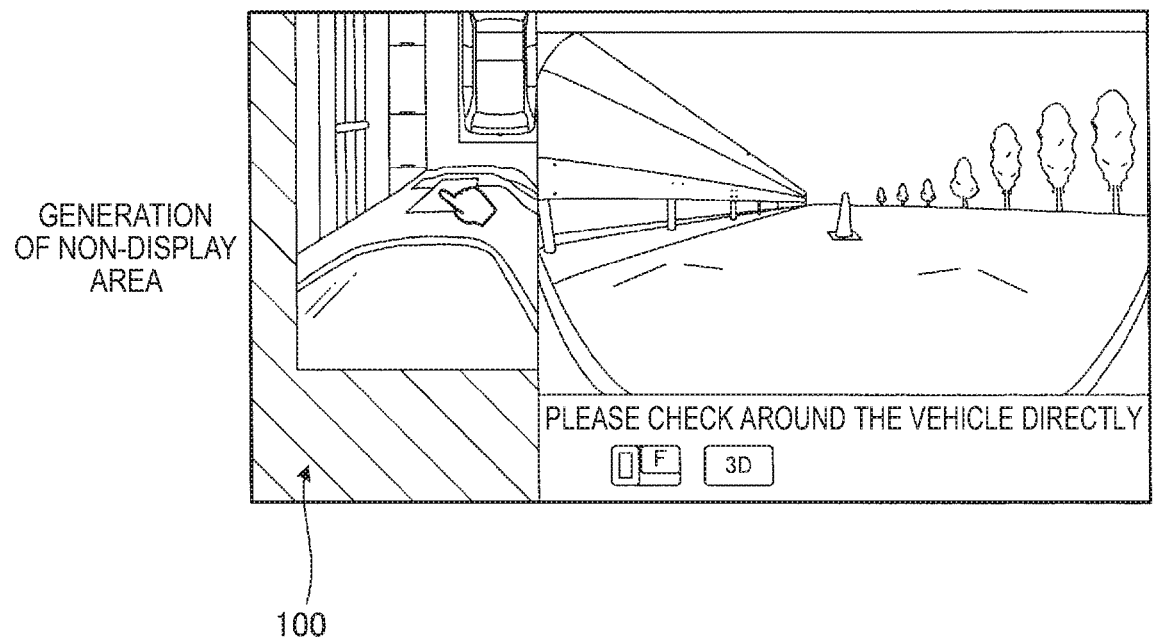
FIG. 10 is a diagram illustrating an example of an enlarged screen displayed by the display control unit according to a comparative example.

Therefore, as illustrated in FIG. 9, for example, as a display control device of a comparative example, it is conceivable to enlarge the display on the screen about a designated point which is designated by the user. At this time, for example, it is assumed that the display is enlarged after the display position of the designated point is moved to the center of the screen. However, when the designated point is moved to the center, the user may feel discomfort. Further, when an area outside the imaging range of the imaging unit or outside the generation area of composite image data is included in an enlarged image due to the movement of the designated point, as illustrated in FIG. 10, a non-display area 100 where no image may be displayed is generated.

According to the ECU 14 of the first embodiment, the display control unit 404 enlarges the display about the designated point. Further, the display control unit 404 enlarges the display without moving the display position of the designated point. Thus, an arbitrary position on the screen may be enlarged and displayed without generating the non-display area 100. The user does not feel discomfort since the display is enlarged without movement of the designated point. As described above, according to the ECU 14 of the first embodiment, it is possible to improve the controllability of the display of image data such as captured image data or composite image data.

According to the ECU 14 of the first embodiment, the display control unit 404 causes various icons 51 and 52 to be displayed when an arbitrary position is designated by the user and is received by the operation receiving unit 407. Thus, there is no need to constantly display, for example, an operation icon on the screen.

According to the ECU 14 of the first embodiment, the operation receiving unit 407 receives an operation such as touching, sliding, or dragging on the screen by the user. Thus, even in a multi-tap non-compatible monitor that does not provide pinch-in or pinch-out, it is possible to perform enlargement and reduction operations at an arbitrary position with a single tap. Further, it is possible to more precisely designate an enlargement position than an operation by pinch-in or pinch-out.

Modification

The first embodiment has described an example in which enlargement or reduction is performed on the bird's-eye view image data and the stereoscopic image data (an example of composite image data) generated based on a plurality of captured image data. However, the present embodiment is not limited to a case where enlargement or reduction is performed on composite image data.

That is, the display control unit 404 may perform display enlargement or reduction on the captured image data acquired from the imaging unit 15 as in the first embodiment. As a detailed example, when the operation receiving unit 407 receives designation of an arbitrary point on the captured image data while the captured image data acquired from the imaging unit 15 is displayed on the screen, the display control unit 404 enlarges the display of the captured image data about a point designated on the captured image data as the center of enlargement in a state where the display position of the designated point does not move on the screen.

Second Embodiment

A second embodiment will be described with reference to FIGS. 11 and 12. In the following description, components of the second embodiment corresponding to the first embodiment will be denoted by the same reference numerals with reference to FIGS. 1 to 4. An example of the second embodiment differs from the first embodiment in that the display control unit 404 enlarges a plurality of displays in conjunction with each other.
(Linkage of Multiple Screens)

FIG. 11 is a flow diagram illustrating one example of a procedure of enlargement control by the display control unit 404 according to a second embodiment. In FIG. 11, the bird's-eye view image data generated by the bird's-eye view image generation unit 402 is displayed on the left side of the screen. On the right side of the screen, the stereoscopic image data generated by the stereoscopic image generation unit 403 is displayed.

As illustrated in (a) of FIG. 11, when the user touches an arbitrary position in the area of the display device 8 where the bird's-eye view image data is displayed, the operation receiving unit 407 receives designation by such user operation and the display control unit 404 causes an enlargement icon 51*a* to be displayed at a designated point which is a touch position on the display device 8. When the user performs upward sliding or dragging according to the enlargement icon 51*a*, the operation receiving unit 407 receives designation by such user operation, and as illustrated in (b) of FIG. 11, the display control unit 404 gradually enlarges the display of the bird's-eye view image data to a predetermined magnification.

At this time, the display control unit 404 also gradually enlarges the display of the stereoscopic image data in conjunction with the display of the bird's-eye view image data. In the enlargement of the display of the stereoscopic image data, a point corresponding to the designated point in the display of the bird's-eye view image data is used as a designated point. The display control unit 404 enlarges the display of the stereoscopic image data about the designated point without moving the display position of the designated point.

That is, the operation receiving unit 407 receives designation of an arbitrary point in the bird's-eye view image data. Then, when the operation receiving unit 407 receives the designation of the arbitrary point, the display control unit 404 enlarges the bird's-eye view image data about the designated point as the center of enlargement in a state where the display position of the designated point does not move on the screen, and also enlarges the stereoscopic image data about a corresponding point of the stereoscopic image data, which is associated with the designated point on the bird's-eye view image data in a lookup table, as the center of enlargement in a state where the display position of the corresponding point does not move on the screen.

Here, the bird's-eye view image data is, for example, first image data, and the designated point on the bird's-eye view image data is, for example, a first point. Further, the stereoscopic image data is, for example, second image data, and the point as the center of enlargement in the stereoscopic image data is, for example, a second point. At this time, it is assumed that the first point and the second point are points indicating the same position in the peripheral area of the vehicle. In the present embodiment, the look-up table in which the first point of the first image data and the second point of the second image data are associated with each other is stored in advance in the ROM 14*b*. Thus, the second point of the second image data may be specified by substituting the first point of the first image data into the look-up table.

The present example has described the procedure of designating a display area of the bird's-eye view image data and enlarging the display of the stereoscopic image data in conjunction with the display of the bird's-eye view image data, but an inverse procedure is possible. That is, when the operation receiving unit 407 receives designation of a display area of the stereoscopic image data by the user and an enlargement operation is performed, the display control unit 404 enlarges the display of the bird's-eye view image data in conjunction with the display of the stereoscopic image data.

That is, the present embodiment is not limited to the enlargement of the stereoscopic image data about the point, which is the center of the enlargement of the stereoscopic image data, corresponding to the point designated on the bird's-eye view image data. For example, the bird'-eye view image data may be enlarged about a second point, which is the center of the enlargement of the bird's-eye view image data as second image data, corresponding to a first point designated on the stereoscopic image data as first data.

Further, the present example has described a case where the display control unit 404 performs display enlargement control, but cancellation of the enlargement control is also performed in the same procedure. That is, when an arbitrary point is designated on the display of the bird's-eye view image data or on the display of the stereoscopic image data and an operation of canceling the enlargement control is performed, the display control unit 404 performs cancellation of the enlargement control while displaying the bird's-eye view image data in conjunction with the display of the stereoscopic image data.
(Enlargement Involving Viewpoint Movement)

As described above, when the display of the stereoscopic image data is enlarged in conjunction with the display of the bird's-eye view image data, it may not possible to designate a point corresponding to the designated point in the display of the bird's-eye view image data as a designated point in the display of the stereoscopic image data. This is a case where the corresponding point is hidden behind a vehicle shape model in the display of the stereoscopic image data. Such an example will be described below with reference to FIG. 12.

FIG. 12 is a flow diagram illustrating another example of a procedure of enlargement control by the display control unit 404 according to the second embodiment. As illustrated in (a) of FIG. 12, the user touches the left side of a vehicle icon in a display area of the bird's-eye view image data, and the operation receiving unit 407 receives this touch as a designated point. In the display of the stereoscopic image data, a point corresponding to the designated point is hidden behind a vehicle shape model and is invisible.

Therefore, as illustrated in (b) of FIG. 12, the display control unit 404 moves a viewpoint to a position where the point corresponding to the designated point is visible in the display of the stereoscopic image data. That is, since, in the display of the stereoscopic image data, the viewpoint is originally directed from the diagonal right rear side in a bird's eye view form, for example, the display control unit 404 moves the viewpoint so as to be directed to the diagonal left rear side. At this time, the viewpoint may be gradually moved around the rear of the vehicle shape model.

Then, as illustrated in (c) of FIG. 12, the display control unit 404 enlarges the display of the stereoscopic image data in conjunction with the display of the bird's-eye view image data. At this time, the display control unit 404 may enlarge the display of the stereoscopic image data in parallel with the viewpoint movement from the diagonal right rear side to the diagonal left rear side.

The present example has described a case where the display control unit 404 performs display enlargement control, but cancellation of the enlargement control is also performed in the same procedure involving the viewpoint movement.

The ECU 14 of the second embodiment also exerts the same effects as those of the ECU 14 of the first embodiment.

Further, according to the ECU 14 of the second embodiment, the display control unit 404 enlarges the display of the bird's-eye view image data in conjunction with the display of the stereoscopic image data. This makes it possible to display enlarged images at the same position from various viewpoints without performing operations separately on a plurality of screens.

Further, according to the ECU 14 of the second embodiment, when a point corresponding to a designated point in the display of the bird's-eye view image data is hidden by the vehicle shape model in the display of the stereoscopic image data, the display control unit 404 moves the viewpoint in the display of the stereoscopic image data so that the corresponding point appears. Thus, it is possible to display an enlarged image of the stereoscopic image data at the same position as the display of the bird's-eye view image data even if the user does not perform viewpoint movement in the display of the stereoscopic image data in advance.

Modification

In the present modification, in a screen on which a plurality of images are displayed, when an operation is performed on one image, the other image is under the control corresponding to the operation.

That is, the display control unit 404 causes first and second image data based on captured image data to be displayed on the screen. The operation receiving unit 407 receives designation of an arbitrary first point on the first image data. The display control unit 404 enlarges the display of the second image data about a second point of the second image data corresponding to the first point as the center of enlargement in a state where the display position of the second point does not move on the screen. Then, the display control unit 404 does not enlarge the display of the first image data.

Here, the screen on which the first and second image data based on the captured image data are displayed may be a screen on which bird's-eye view image data and stereoscopic image data are displayed. Further, when the first image data is bird's-eye view image data, the second image data may be stereoscopic image data. Further, when the first image data is stereoscopic image data, the second image data may be bird's-eye view image data.

More specifically, for example, in the screen on which bird's-eye view image data and stereoscopic image data are displayed, it is assumed that the operation receiving unit 407 receives designation of an arbitrary point (first point) in the bird's-eye view image data. Then, the display control unit 404 enlarges the display of the stereoscopic image data about a point (second point) of the stereoscopic image data corresponding to the designated point as the center of enlargement in a state where the display position of the point corresponding to the designated point does not move on the screen. At this time, the bird's-eye-view image data on which an operation has actually been performed is not enlarged. In addition, in this case, when the point in the display of the stereoscopic image data corresponding to the designated point in the display of the bird's-eye view image data is hidden behind the vehicle shape model, viewpoint movement of the display of the stereoscopic image data is also performed.

Further, for example, in the screen on which bird's-eye view image data and stereoscopic image data are displayed, it is assumed that the operation receiving unit 407 receives designation of an arbitrary point (first point) in the stereoscopic image data. Then, the display control unit 404 enlarges the display of the bird's-eye view image data about a point (second point) of the bird's-eye view image data corresponding to the designated point as the center of enlargement in a state where the display position of the point corresponding to the designated point does not move on the screen. At this time, the stereoscopic image data on which an operation has actually been performed is not enlarged.

That is, in the configuration of the present modification, one image data functions as a remote control screen of the other image data. Although the case of enlarging any one image data has been described above, the configuration of the present modification may also be applied to an operation and control of reducing the image data. Further, although the bird's-eye view image data and the stereoscopic image data have been described above, one or both may be the captured image data acquired from the imaging unit 15.

A display control device according to an aspect of this disclosure includes, for example, an image acquisition unit configured to acquire captured image data from an imaging unit that captures an image of a peripheral area of a vehicle, a display control unit configured to cause image data based on the captured image data to be displayed on a screen, and an operation receiving unit configured to receive designation of an arbitrary point on the screen, wherein the display control unit enlarges display on the screen about the designated point as a center of enlargement in a state where a display position of the designated point does not move on the screen when the operation receiving unit receives the designation of the arbitrary point on the screen.

Thus, as an example, it is possible to improve the controllability of displaying the image data.

The display control unit may enlarge the display on the screen when the operation receiving unit receives a predetermined operation after receiving the designation of the arbitrary point on the screen.

Thus, as an example, a user may consciously operate, which may prevent an erroneous operation and the like.

The image acquisition unit may acquire a plurality of captured image data from a plurality of the imaging units, and the display control unit may enlarge the display on the screen on which composite image data generated based on the plurality of captured image data is displayed.

Thus, as an example, it is possible to enlarge and display a predetermined position on the composite image data.

The display control unit may enlarge display of the captured image data about the designated point on the captured image data displayed on the screen as a center of enlargement in a state where the display position of the designated point does not move on the screen when the captured image data acquired from the imaging unit is displayed on the screen.

Thus, as an example, it is possible to enlarge and display a predetermined position on the captured image data.

The operation receiving unit may receive designation of an arbitrary first point in first composite image data, and the display control unit may enlarge display of the first composite image data about the first point included in the first composite image data as a center of enlargement in a state where a display position of the first point does not move on the screen when the operation receiving unit receives the designation of the first point, and also enlarge display of second composite image data about a second point of the second composite image data, corresponding to the first point, as a center of enlargement in a state where a display position of the second point does not move on the screen.

Thus, as an example, it may not necessary to perform operations separately on a plurality of screens.

The display control unit may cause first image data based on the captured image data and second image data based on the captured image data and different from the first image data to be displayed on the screen, the operation receiving unit may receive designation of an arbitrary first point of the first image data, and the display control unit may enlarge display of the second image data about a second point of the second image data, corresponding to the first point, as a center of enlargement in a state where a display position of the second point does not move on the screen, and does not perform enlargement of display of the first image data.

Thus, as an example, it is possible to select and enlarge only display that requires enlargement.

The first composite image data may be stereoscopic image data for stereoscopically displaying a vehicle shape model, and, when the operation receiving unit receives designation of an arbitrary point in the display of the second composite image data and when a point corresponding to the designated point is hidden by the vehicle shape model in the display of the first composite image data, the display control unit may move a viewpoint in the display of the first composite image data to reveal the corresponding point.

Thus, as an example, the user may not need to move the viewpoint of the display of a stereoscopic image data in advance.

The display control unit may gradually change the display on the screen in a case of enlarging the display on the screen or canceling enlargement of the display on the screen.

Thus, as an example, it is possible to obtain display consistency.

In this way, although the embodiments disclosed here have been illustrated, the embodiments and the modifications described above are merely given by way of example and are not intended to limit the scope of the disclosure. The embodiments or modifications may be implemented in various other forms, and various omissions, replacements, combinations, and changes may be made without departing from the gist of the disclosure. Further, the configuration or the shape of each embodiment or each modification may be partially replaced and implemented.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A display control device comprising:
    at least one processor configured to implement:
    an image acquisition unit configured to acquire captured image data from an imaging unit that captures an image of a peripheral area of a vehicle;
    a display control unit configured to cause image data based on the captured image data to be displayed on a screen; and
    an operation receiving unit configured to receive designation of an arbitrary point on the screen, wherein
    the display control unit enlarges display on the screen about the designated arbitrary point as a center of enlargement in a state where a display position of the designated arbitrary point does not move on the screen when the operation receiving unit receives the designation of the arbitrary point on the screen,
    wherein
    the operation receiving unit receives designation of an arbitrary first point in first composite image data, and
    the display control unit
        enlarges display of the first composite image data, in response to the designation of the arbitrary first point, about the arbitrary first point included in the first composite image data as a center of enlargement in a state where a display position of the arbitrary first point does not move on the screen when the operation receiving unit receives the designation of the first point, and
        also enlarges display of second composite image data, in response to the designation of the arbitrary first point, about a second point of the second composite image data, corresponding to the arbitrary first point, as a center of enlargement in a state where a display position of the second point does not move on the screen.

2. The display control device according to claim 1, wherein
    the display control unit enlarges the display on the screen when the operation receiving unit receives a predetermined operation after receiving the designation of the arbitrary point on the screen.

3. The display control device according to claim 1, wherein
    the image acquisition unit acquires a plurality of captured image data from a plurality of the imaging units, and
    the display control unit enlarges the display on the screen on which composite image data generated based on the plurality of captured image data is displayed.

4. The display control device according to claim 1, wherein
    the display control unit enlarges display of the captured image data about the designated arbitrary point on the captured image data displayed on the screen as a center of enlargement in a state where the display position of the designated arbitrary point does not move on the screen when the captured image data acquired from the imaging unit is displayed on the screen.

5. The display control device according to claim 1, wherein the first composite image data is stereoscopic image data for stereoscopically displaying a vehicle shape model, and when the operation receiving unit receives designation of an arbitrary point in the display of the second composite image data and when a point corresponding to the designated arbitrary point is hidden by the vehicle shape model in the display of the first composite image data, the display control unit moves a viewpoint in the display of the first composite image data to reveal the corresponding point.

6. The display control device of claim 1, wherein the display control unit gradually changes the display on the screen in a case of enlarging the display on the screen or canceling enlargement of the display on the screen.

7. A display control device comprising:

at least one processor configured to implement:

an image acquisition unit configured to acquire captured image data from an imaging unit that captures an image of a peripheral area of a vehicle;

a display control unit configured to cause image data based on the captured image data to be displayed on a screen; and an operation receiving unit configured to receive designation of an arbitrary point on the screen, wherein the display control unit enlarges display on the screen, in response to the designation of the arbitrary point, about the designated arbitrary point as a center of enlargement in a state where a display position of the designated arbitrary point does not move on the screen when the operation receiving unit receives the designation of the arbitrary point on the screen, wherein the display control unit causes first image data based on the captured image data and second image data based on the captured image data and different from the first image data to be displayed on the screen, the operation receiving unit receives designation of an arbitrary first point of the first image data, and the display control unit enlarges display of the second image data, in response to the designation of the arbitrary first point, about a second point of the second image data, corresponding to the arbitrary first point, as a center of enlargement in a state where a display position of the second point does not move on the screen, and does not perform enlargement of display of the first image data.

\* \* \* \* \*